(12) United States Patent
Hiller et al.

(10) Patent No.: US 7,511,914 B2
(45) Date of Patent: Mar. 31, 2009

(54) FLY HEIGHT COMPENSATION USING TEMPERATURE AND NON-REPEATABLE RUNOUTS

(75) Inventors: Bernhard Hiller, San Jose, CA (US); Andrew LeFebvre, Campbell, CA (US); Francis Crimi, Los Altos, CA (US)

(73) Assignee: Maxtor Corporation, Scotts Valley, CA (US)

( * ) Notice: Subject to any disclaimer, the term of this patent is extended or adjusted under 35 U.S.C. 154(b) by 0 days.

(21) Appl. No.: 11/693,415

(22) Filed: Mar. 29, 2007

(65) Prior Publication Data

US 2007/0230017 A1 Oct. 4, 2007

Related U.S. Application Data

(60) Provisional application No. 60/743,924, filed on Mar. 29, 2006.

(51) Int. Cl.
G11B 21/02 (2006.01)
(52) U.S. Cl. .......................................... 360/75
(58) Field of Classification Search .............. 360/75, 360/25, 99.08, 97.02; 384/100, 112; 310/90; 29/898.1
See application file for complete search history.

(56) References Cited

U.S. PATENT DOCUMENTS

| | | | |
|---|---|---|---|
| 5,379,171 A | | 1/1995 | Morehouse et al. |
| 5,867,340 A | | 2/1999 | Morehouse et al. |
| 6,250,807 B1 | * | 6/2001 | Mori et al. ............... 384/100 |
| 6,351,341 B1 | * | 2/2002 | Lee et al. .................... 360/75 |
| 6,597,539 B1 | | 7/2003 | Stupp et al. |
| 6,672,767 B2 | * | 1/2004 | Hajota et al. ............. 384/112 |
| 6,735,036 B1 | | 5/2004 | Olim |
| 6,760,191 B1 | | 7/2004 | Yan et al. |
| 6,842,313 B1 | | 1/2005 | Mallary |
| 6,843,602 B2 | * | 1/2005 | Koseki et al. ............. 384/100 |
| 6,914,358 B2 | * | 7/2005 | Tokunaga et al. ............ 310/90 |
| 6,920,013 B2 | * | 7/2005 | Nishimura et al. ....... 360/99.08 |
| 6,954,326 B2 | | 10/2005 | Bement et al. |
| 7,088,532 B1 | * | 8/2006 | Krajnovich et al. ........... 360/25 |
| 7,123,440 B2 | * | 10/2006 | Albrecht et al. .......... 360/97.02 |
| 7,206,159 B2 | * | 4/2007 | White ......................... 360/75 |
| 7,271,974 B2 | * | 9/2007 | Fukuyama et al. ............ 360/75 |
| 7,343,682 B2 | * | 3/2008 | Sumi et al. ................. 29/898.1 |
| 2005/0099722 A1 | * | 5/2005 | Nishimura et al. ....... 360/99.08 |
| 2005/0286166 A1 | * | 12/2005 | Ando et al. .............. 360/99.08 |

OTHER PUBLICATIONS

Patent-Assignee: International Business Machines Corp [IMBC] Title: Magneto-resistive head fly-height adjusting method for hard disk drive involves determining voltage to be applied to piezoelectric elements based on temperature and pressure within disk platter enclosure Date: Pub-Date May 10, 2002, Pub-No: RD 457171A, Appl-No. 2002RD-457171.*

* cited by examiner

*Primary Examiner*—Fred Tzeng
(74) *Attorney, Agent, or Firm*—Westman, Champlin & Kelly P.A.

(57) ABSTRACT

A controller is provided having a circuit that uses non-repeatable run-out data and temperature data to provide a compensation for a fly height of a head. A disk drive may also be provided having a head for reading data from a disk, a thermistor, and a controller for controlling a fly height of the head based on temperature data obtained from the thermistor to refine a pressure determination. A method can include estimating a first pressure by the use of non-repeatable run-out data and temperature data corresponding to a disk drive.

19 Claims, 4 Drawing Sheets

| | T/P | H6X02W2H | | | H6X031HH | | | H8Z0712J | | |
|---|---|---|---|---|---|---|---|---|---|---|
| | | 760 | 632 | 522 | 760 | 632 | 522 | 760 | 632 | 522 |
| Total NRRO | 288 | 3.136286 | 2.791302 | 2.41025 | 3.32748 | | 2.324789 | 2.994146 | 2.541437 | 2.068177 |
| | 313 | 2.911109 | 2.521665 | 2.147204 | 3.089474 | 2.687705 | | 2.83032 | 2.262934 | 2.003432 |
| | 333 | 2.638663 | 2.303801 | 1.948489 | 3.008587 | 2.619483 | 2.306832 | 2.683473 | 2.19522 | 1.913633 |
| | T/P | H6X02W2H | | | H6X031HH | | | H8Z0712J | | |
| | | 760 | 632 | 522 | 760 | 632 | 522 | 760 | 632 | 522 |
| Pressure, modeled | 288 | 775.6805 | 687.8731 | 548.7941 | 779.6894 | | | 756.5081 | 615.0365 | 467.1429 |
| | 313 | 760 | 638.299 | 521.28 | 760 | 634.4471 | 521.0358 | 760 | 582.6917 | 501.5974 |
| | 333 | 718.6108 | 613.9662 | 502.9313 | 778.4729 | 656.8778 | 559.1742 | 757.8602 | 605.2814 | 517.2854 |
| | T/P | H6X02W2H | | | H6X031HH | | | H8Z0712J | | |
| | | 760 | 632 | 522 | 760 | 632 | 522 | 760 | 632 | 522 |
| Pressure Error | 288 | 2% | 6% | 5% | 3% | | | 0% | 3% | 11% |
| | 313 | 0% | 1% | 0% | 0% | 0% | 0% | 0% | 8% | 4% |
| | 333 | 5% | 3% | 4% | 2% | 4% | 7% | 0% | 4% | 1% |
| | | | 3% | | | 2% | | | 3% | |

FIG. 2

|  | T/P | H6X02W2H | | | H6X031HH | | | H8Z0712J | | |
|---|---|---|---|---|---|---|---|---|---|---|
|  |  | 760 | 632 | 522 | 760 | 632 | 522 | 760 | 632 | 522 |
| Total NRRO | 288 | 3.136286 | 2.791302 | 2.41025 | 3.32748 |  |  | 2.994146 | 2.541437 | 2.068177 |
|  | 313 | 2.911109 | 2.521665 | 2.147204 | 3.089474 | 2.687705 | 2.324789 | 2.83032 | 2.262934 | 2.003432 |
|  | 333 | 2.638663 | 2.303801 | 1.948489 | 3.008587 | 2.619483 | 2.306832 | 2.683473 | 2.19522 | 1.913633 |
|  | T/P | H6X02W2H | | | H6X031HH | | | H8Z0712J | | |
|  |  | 760 | 632 | 522 | 760 | 632 | 522 | 760 | 632 | 522 |
| Pressure, modeled | 288 | 753.3886 | 670.5177 | 578.9824 | 753.1694 | 0 | 0 | 739.7742 | 627.9217 | 510.0918 |
|  | 313 | 760 | 658.3285 | 560.5684 | 760 | 661.1661 | 571.89 | 760 | 607.6449 | 537.9632 |
|  | 333 | 732.8904 | 639.8821 | 41.194 | 787.393 | 685.5585 | 603.7329 | 766.6111 | 627.1278 | 546.6844 |
|  | T/P | H6X02W2H | | | H6X031HH | | | H8Z0712J | | |
|  |  | 760 | 632 | 522 | 760 | 632 | 522 | 760 | 632 | 522 |
| Pressure Error | 288 | 1% | 6% | 11% | 1% |  |  | 3% | 1% | 2% |
|  | 313 | 0% | 4% | 7% | 0% | 5% | 10% | 0% | 4% | 3% |
|  | 333 | 4% | 1% | 4% | 4% | 8% | 16% | 1% | 1% | 5% |
|  |  |  | 4% |  |  | 6% |  |  | 2% |  |

FLY HEIGHT COMPENSATION USING TEMPERATURE AND NON-REPEATABLE RUNOUTS

CROSS-REFERENCE TO RELATED PATENT APPLICATIONS

Embodiments of the present invention relate to U.S. Provisional Application Ser. No. 60/743,924, filed Mar. 29, 2006, entitled "NRO Altitude Estimation with Temperature Correction", the contents of which are incorporated by reference herein and which is a basis for a claim of priority.

FIELD OF THE INVENTION

Embodiments of the present invention relate generally to disk drives and methods and more particularly to adjusting fly height.

BACKGROUND OF THE INVENTION

Disk drives are widely used in computers and other electronic devices for the storage and retrieval of data. A major goal among many disk drive manufacturers is to continue to increase the amount of data that can be stored on a recording medium while still maintaining data integrity and disk drive reliability. Lowering the flying height of a head over a recording medium can increase the areal density. However, there have been problems with lowering a flying height of a head in that damage may be caused due to contact between the head and the recording medium.

Increasing a magnetic storage density of a recording medium requires increasing a number of data bits per square inch on the recording medium. Placing a read structure and a write structure of a head closer to a recording medium allows for increasing the magnetic storage density of the recording medium. This is because a magnetic field detected by a read element from a portion of the recording medium under the read element increases exponentially as the read element is moved closer to the recording medium. Moving the read element closer to the recording medium allows for compensating for lower flux levels provided from smaller areas on the recording medium where a given bit of data is recorded. Also, a strength of magnetic flux from the write structure to the recording medium and an accuracy of directing magnetic flux to a specific portion of the recording medium may be improved the closer the write structure is to the recording medium.

However, placing a head closer to a recording medium may increase a probability that the head will contact the recording medium when flying over the recording medium. Such contact between the head and the recording medium may damage the head and the recording medium. As a consequence, disk drive reliability may be adversely affected by contact between the head and the recording medium due to low flying heights of the head over the recording medium. Accordingly, there is a need to address factors affecting flying height of heads to enable low flying heights while minimizing contact between the head and recording medium.

SUMMARY OF THE DISCLOSURE

Embodiments of the present invention relate to disk drives and methods that allow for use of temperature information in compensating fly height of a head. According to one exemplary embodiment, a controller, includes a circuit that uses non-repeatable run-out data and temperature data to provide a compensation for a fly height of a head. In another embodiment, a disk drive may also be provided having the above-mentioned controller, along with a disk having a surface provided with a plurality of tracks for storing data, a head for reading data from the disk, and an actuator for positioning the head relative to the disk.

A further example embodiment of the present invention provides a method. The method includes estimating a first pressure by the use of non-repeatable run-out data and temperature data corresponding to a disk drive.

Another example embodiment provides a disk drive having a head for reading data from a disk, a thermistor, and a controller for controlling a fly height of the head based on temperature data obtained from the thermistor to refine a pressure determination.

BRIEF DESCRIPTION OF THE DRAWINGS

FIG. 2 is a table showing test results using an equation for which a proportionality constant C is determined.

DETAILED DESCRIPTION OF PREFERRED EMBODIMENTS

Various embodiments of the present invention recognize that head fly height adjustment based on air pressure can be further refined by also accounting for temperature. In one implementation, temperature data is obtained from a thermistor located in the disk drive. Fly height adjustment compensation aims to properly locate the height of the head above the disk in order to maximize data transfer. Air pressure decreases can lead to a flying height decrease and can lead to contact between the head and disk. By being able to adjust for differences in the characteristics in the environment surrounding the head, clearances could be reduced and areal densities increased. While aspects of the invention may be particularly useful for mobile disk drives, such as notebook drives or small form factor consumer electronics drives, stationary drives can benefit as well.

Disk drives include one or more disks for storing data, an actuator, one or more heads, and a servo controller. Each head is operable to read data from and to write data to one or more tracks on a surface of a corresponding disk. The tracks are typically concentric circular tracks, but a disk may have a spiral track, such as is common for compact discs (CDs). The heads are connected to the actuator, and when a head performs a read or a write operation on a disk, the actuator is moved as part of a seek operation so that the head is positioned over a destination track. The movement of the actuator during a seek operation is controlled by the servo controller based in part on a seek profile that specifies how the actuator is to be moved during the seek operation.

Figure 1:
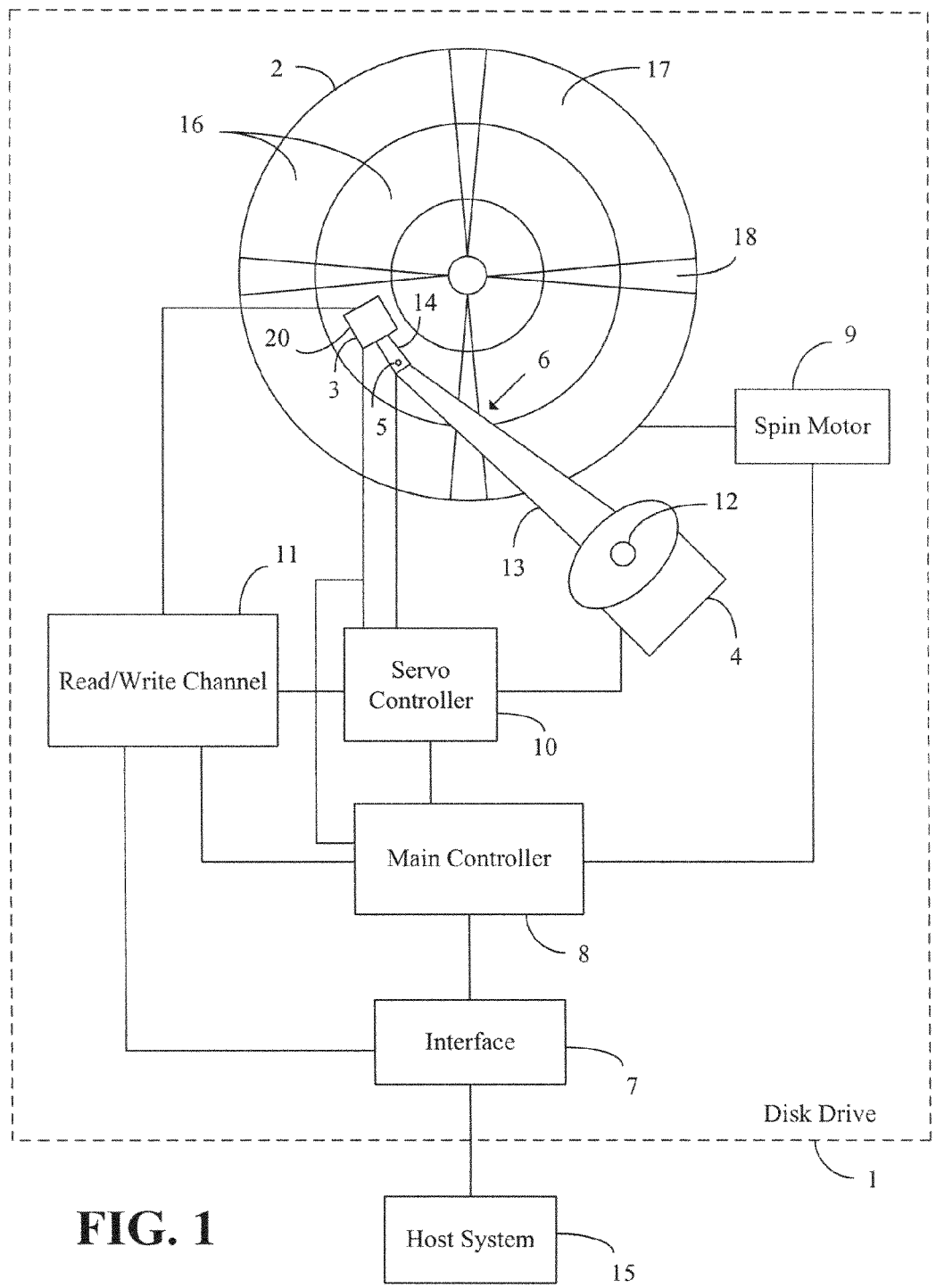
FIG. 1 illustrates a functional block diagram of a disk drive of an embodiment of the present invention.

FIG. 1 illustrates a functional block diagram of a disk drive 1 of an example embodiment of the present invention. The disk drive 1 comprises a disk 2, a transducer or head 3, a coarse actuator 4, a microactuator 5, an actuator arm assembly 6, an interface 7, a main controller 8, a spin motor 9, a servo controller 10, and a read/write (r/w) channel 11. The head 3 is mounted on one end of the actuator arm assembly 6, and another end of the actuator arm assembly 6 is connected to a base (not shown) of the disk drive 1 by a bearing 12. It is understood that various components may be combined, examples include the servo controller 10 and main controller 8. According to one exemplary embodiment of the invention, a controller, includes a circuit that uses non-repeatable runout data and temperature data to provide a compensation for a fly height of a head.

While embodiments of the invention may use only a single actuator and single member arm, for purposes of illustration, the exemplary embodiment of FIG. 1 is shown with the actuator arm assembly 6 having a first member 13 and a second member 14 that are interconnected by the microactuator 5. During operation, the disk 2 spins around a central axis, and the head 3 reads data from or writes data to a surface of the disk 2. The coarse actuator 4 rotates the actuator arm assembly 6 about the bearing 12 in order to control a position of the microactuator 5 and the head 3 over the disk 2. The microactuator 5 moves the second member 14 of the actuator arm assembly 6 to position the head 3 over the disk 2.

The coarse actuator 4 may comprise a motor, such as a voice coil motor and the like, and may provide for coarse positioning of the head 3 over the disk 2. The microactuator 5 may comprise, for example, a piezoelectric actuator, an electromagnetic actuator, an electrostatic actuator, and the like. The microactuator 5 may provide for fine positioning of the head 3 over the disk 2. A range of movement of the microactuator 5 may be small, such as moving the head 3 across a few tracks, while a range of movement of the coarse actuator 4 may be large, such as moving the head 3 across all tracks on the disk 2.

The disk drive 1 is not limited to having only a single disk 2, but may have a plurality of disks. Also, data may be written to both a top surface and a bottom surface of each disk, in which case a different head is required for each surface. A head located between disks is considered an inner head, while a head located on an outer surface of the top or bottom disk is an outer head. The head 3 may have a single element for performing both reading and writing, or the head 3 may have separate elements for performing each of those operations, in which case the head 3 would comprise a read element and a write element.

In the following discussion, the disk drive 1 is described with reference to functional blocks and not discrete hardware elements. The functions may be implemented using one or more of hardware, software, and firmware. In addition, more than one function, or different parts of functions, may be combined in a given hardware, software, or firmware implementation.

When the disk drive 1 is connected to a host system 15, the interface 7 communicates with the host system 15 to receive, for example, data and commands, and to send, for example, data and status identifiers. The interface 7 also communicates with the main controller 8 and the r/w channel 11 to send and receive, for example, data and commands. When the main controller 8 receives a command from the interface 7 for a read or a write operation, the main controller 8 provides a signal to the spin motor 9 to cause the disk 2 to spin.

As shown in FIG. 1, the disk 2 has a plurality of tracks 16 for storing data. Each of the tracks 16 has a plurality of data sectors 17 and a plurality of embedded servo sectors 18. During operation of the disk drive 1, a data block may be read from or written to a data sector of the plurality of data sectors 17. The plurality of embedded servo sectors 18 are written with servo patterns or data that are used for determining a position of the head 3 with respect to a track of the plurality of tracks 16.

When performing a read or a write operation, the main controller 8 sends a signal that contains information about a selected track to the servo controller 10. The servo controller 10 then performs a seek operation to position the head 3 over the selected track. The seek operation may be a short seek operation, in which the head 3 is moved across a small number of tracks, or a long seek operation, in which the head 3 is moved across a large number of tracks.

During a seek operation, the head 3 reads data from servo sectors of the plurality of servo sectors 18 on the disk 2, and the head 3 provides a signal based on the read data to the r/w channel 1. The r/w channel 11 processes the signal from the head 3 when the head 3 reads data from the servo sectors, and the r/w channel 11 provides servo information to the servo controller 10 by processing the signal from the head 3. The servo controller 10 uses the servo information as a sensed position signal that indicates a position of the head 3 with respect to a track of the plurality of tracks 16. A sensed position signal may be used as feedback. Thus, a position error signal (PES) may indicate a difference between a desired reference position of the head 3 specified by the reference signal and an actual position of the head 3 specified by the sensed position signal.

Ideally, the head 3 is positioned directly over a center of the selected track during the seek operation. However, when the head 3 is positioned over the selected track, there may be some amount of seek settle track-misregistration (TMR), which represents a misalignment of the head 3 from the center of the selected track during seek settle when the head 3 is settling over the selected track. The seek settle TMR may be due to, for example, the head 3 overshooting the center of the selected track and having to be repositioned toward the center of the selected track. The head 3 may have particular tolerances to perform operations even when there is some TMR, so the servo controller 10 may wait for the head 3 to settle over the selected track, and may declare that the head 3 is on-track once the TMR is within a tolerance of the head 3 for an operation.

When the servo controller 10 determines that the head 3 is on-track, the servo controller 10 sends a signal to the r/w channel 11 to allow for the start of a read or a write operation. It is also possible that the servo controller 10 sends the signal to the main controller 8 rather than to the r/w channel 11, in which case the main controller 8 would then send the signal to the r/w channel 11. The r/w channel 11 also receives a command from the main controller 8 that specifies the type of operation to be performed. In the case of a read operation, the r/w channel 11 causes the head 3 to read the data and then sends the data to either the interface 7 or the main controller 8. In the case of a write operation, the r/w channel 11 receives data from either the interface 7 or the main controller 8 and causes the head 3 to write the data.

A fly height adjustment device 20 may be located in a wide variety of positions and is shown in FIG. 1 at the head 3 for purposes of illustration only. Control of the fly height may be performed by a wide variety of fly height adjustment devices in the art, including, without limitation, angling of an air foil in association with an air bearing, such as that disclosed in U.S. Pat. No. 6,735,036 entitled "Control of Data Sensor Fly Height," the contents of which are incorporated by reference herein. Other examples include the use of devices that change dimension or shape in response to a signal, such as a signal from a controller, examples of which include piezoelectric devices and heating elements. Such devices may be located in a wide variety of locations, including at the head, and/or its slider, optionally positioning the head relative to the slider, at the actuator and or along an actuator arm assembly, or other location configured to move the disk or head relative to each other to adjust the fly height.

Examples of disk drives are provided in the following references: (i) U.S. Pat. No. 6,760,191 entitled "Internal Heat Dissipater used to Reduce Slider and Write Pole Thermal Protrusion for Thin Film Recording Heads"; (ii) U.S. Pat. No. 6,842,313 entitled "Floating Down Stream Perpendicular Write Head Shield"; (iii) U.S. Pat. No. 6,597,539 entitled "Suspension Assembly for Supporting a Read/Write Head over a Rotating Storage Disk with Dynamically Adjustable Fly Height"; and (iv) U.S. Pat. No. 6,954,326 entitled "Dynamically Improving Data Storage Device Performance", the contents of each of which are incorporated by reference herein.

Inside a disk drive there is an appreciable level of induced airflow. Primarily this comes from the spinning disk(s). The actuator, which positions the heads radially, partially disrupts the air flow. The complex air flow that results has components of "repeatable" flow and purely chaotic "non-repeatable" turbulent flow. These air flows become forcing functions, that, in turn, induce sympathetic response in the disks, the actuator arms, the suspensions, etc. The result of these vibrations is to force the read/write head off of the desired data track. The phenomena thus limits the ability to read and record magnetic data tracks at high densities. Inasmuch as it is undesirable to have the head moving off track, it is well established that the read head can be used as an "off-track" or "track misregistration" transducer. Track misregistration (TMR) can be mathematically deconvolved into repeatable runout (RRO) and non-repeatable runout (NRR) components. One can look for the presence of various modes (disk modes, suspension modes, etc.) using the NRR because the turbulent air flow is, by definition, rich in non-repeatable constituents that induce inconsistent (i.e., non-repeatable) forced responses from the disks, suspensions, etc.

The environmental air pressure, relating to altitude, can be obtained by determining the NRR. The NRR response is dependent upon the altitude and the location of the head along the diameter of the disk, such as at an inner diameter (ID), middle diameter (MD) or outer diameter (OD). Therefore, examining the NRR signatures at different frequencies (which implies the vibrations of different structures inside the drive) with the head positioned at multiple locations across the data region, the result of this analysis would yield a means of estimating—or at least bracketing—the altitude at which the drive is operating. By way of example, looking at NRR at the OD and NRR at the ID, the two of these taken together provide an estimation of whether the disk drive is operating near sea level, near ~5,000 ft above sea level, or at or above 10,000 feet above sea level.

By way of example, RRO may be calculated by averaging the position error over x revolutions, such as, for example, 100 revolutions, at a particular track, or among multiple tracks. NRR may be calculated, by way of example, from the non-repeatable part of the run-out data by subtracting the RRO from a single trace and calculating the standard deviation. While this approach essentially uses the whole spectrum, the present invention may use a wide variety of alternative approaches, including, for example, the use of spectral filtering, using only portions of the NRR spectrum, such as only lateral arm and suspension modes which may be very susceptible to windage, using only the spectrum above the system mode, and/or only higher frequencies above, say, 10 kHz, or only portion of spectrum outside any resonance modes. Further variations of implementation can include using outer heads, measuring at only particular parts of the stroke, such as at OD, MD or ID, and/or averaging a number of tracks, such as 5 tracks, or 1 track or another number of tracks. In one implementation, an inner head is measured at OD.

In one implementation, the in-drive thermistor may be used to measure temperature. However, a wide variety of temperature sensors may be used in accordance with the invention. Examples of temperature sensors also include, but are not limited to, a thermocouple, one or more sensitive registers in the preamp, resistance measurement of a heating coil or other temperature sensitive devices.

The temperature data may be used along with an air pressure calculation by the controller, so as to provide a more accurate air pressure value, which factors in temperature. A variety of altitude calculations may be used with the invention, as embodiments of the invention further refine the pressure or altitude determination by adjusting for temperature. The controller, or another component, may then be used to control the fly height, such as by the use of a fly height adjustment device.

Tests were done on three drives having 3 or 4 platters of 125 GB/platter, with data shown in the table 200 of FIG. 2. The total NRR, which is equivalent to the square root of the easily calculable non-repeatable PES variance, was measured on the three drives (2×6-head, 1×8-head) for an inner head (H 4), three thermistor temperatures (15 C/288K; 40 C/313K; 60 C/333K), and three pressures (760 Torr=sea level, 632 Torr=5 kFt, 522 Torr=10 kFt), at the OD (5 tracks 1000-1004 averaged); see first rows "total NRRO".

With the following linear relationship, NRR at temperature T, can be modeled as function of pressure $P_1$.

$$NRR_1 = a + P_1 \times \text{slope}$$

The offset a is modeled as a function of temperature difference with proportionality constant C:

$$a(T) = a_0 + C \times (T_0 - T_1)$$

Developing this formula leads to the final equation to calculate pressure P1:

$$P_1 = P_0 + \frac{NRR_1 - NRR_0 - C \times (T_0 - T_1)}{\text{slope}}$$

$P_0$, $T_0$, and $NRR_0$ are easily measured in the process for each drive and recorded on disk. C and slope are measured during development with curve fitting techniques on a particular class of drives and also recorded on disk during script write. For the three drives tested and displayed in FIG. 2, C was 0.007 and slope was 0.0032. The drive can at regular intervals calculate pressure and feed it back into the fly height adjust algorithm. By way of example, this may be done in the background after a new start-up.

With reference to FIG. 2, the second row set in the table 200 "Pressure, modeled" shows the modeled pressure, and the resulting pressure error is shown in the third set of rows. Most errors are in the low single digits.

Another variation is to use the ideal gas equation for scaling. NRR is proportional to density which is proportional to pressure over temperature:

$$NRR \propto \rho \propto P/T$$

This lends to a scaling formula.

$$P_1 = P_0 \frac{T_1}{T_0} \frac{NRR_1}{NRR_0}$$

Figure 3:
FIG. 3 is a table showing test results using an equation based on the ideal gas law.

$T_1$ and $NRR_1$ are measured in the drive, $P_0$, $T_0$, and $NRR_0$ once during the process. The table 300 of FIG. 3 shows the estimate pressures and errors with the ideal gas equation. The errors are somewhat larger than the values of table 200 determined with the calculation using the proportionality constant above, but the ideal gas equation approach could prove to be more robust over many drives.

Figure 4:
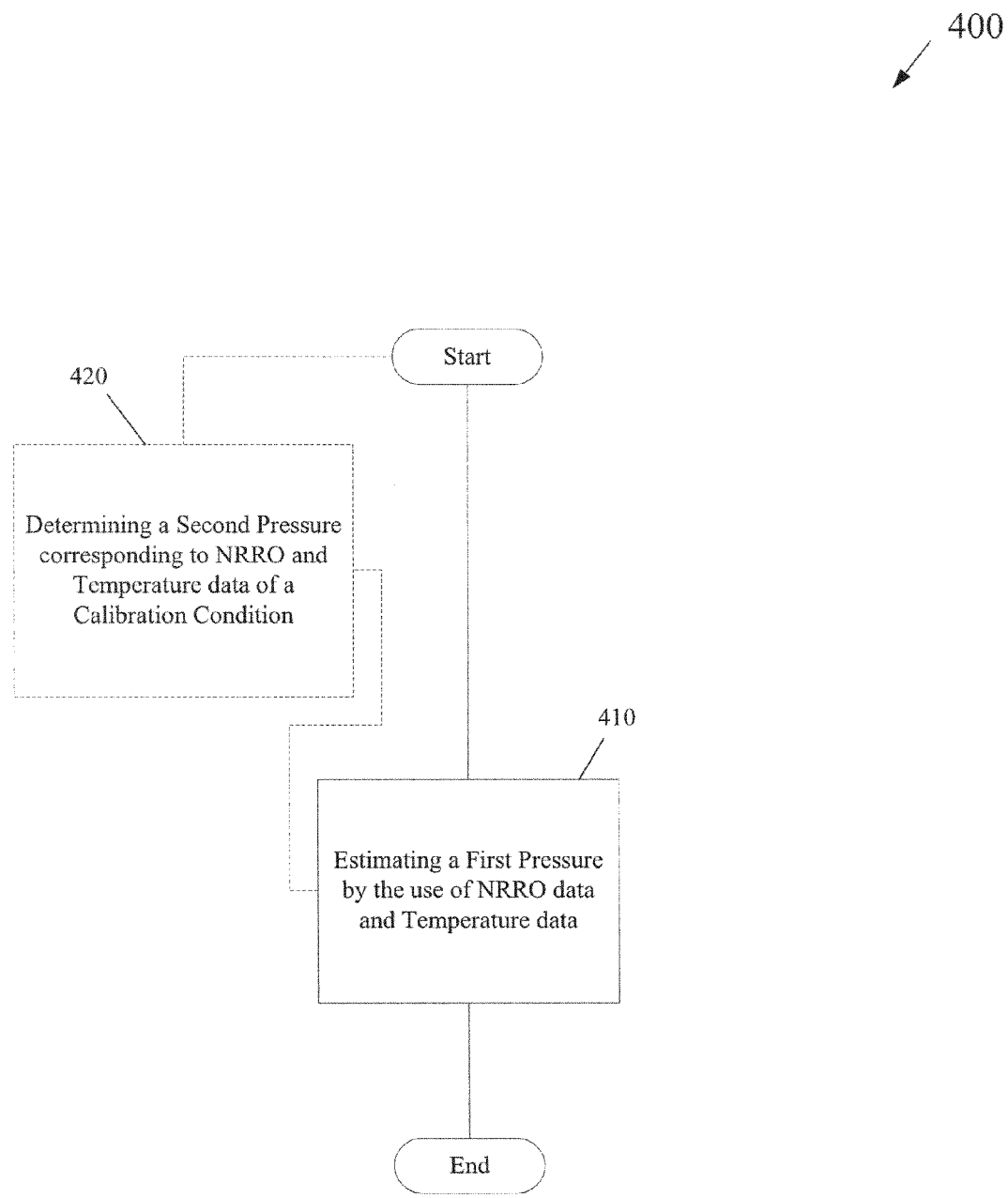
FIG. 4 illustrates a method according to another embodiment of the invention.

A further example embodiment of the present invention provides a method 400 for obtaining a pressure for use with operating a disk drive. With reference to FIG. 4, the method includes estimating 410 a first pressure by the use of non-repeatable run-out data and temperature data corresponding to a disk drive. Optionally, a second pressure, $P_0$, corresponding to the non-repeatable run-out data $NRR_0$ and the temperature data $T_0$ of a calibration condition of drive may be determined 420. In such a case, the first pressure $P_1$ is determined by the equation:

$$P_1 = P_0 \frac{T_1}{T_0} \frac{NRR_1}{NRR_0}$$

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. The scope of the invention is indicated by the attached claims, rather than the embodiments. Various modifications and changes that come within the meaning and range of equivalency of the claims are intended to be within the scope of the invention.

What is claimed is:

1. A controller, comprising:
   an output terminal for operable connection to a fly height adjustment device;
   a circuit that uses non-repeatable run-out and temperature data to provide a compensation signal on the output terminal, to operatively control a fly height adjustment device for controlling a fly height of a head.

2. The controller of claim 1, further comprising a thermistor, wherein the temperature data is obtained from the thermistor.

3. The controller of claim 1, wherein the circuit estimates the first pressure and provides a compensation for a fly height of a head at each startup of the controller.

4. The controller of claim 1, further comprising an inner head, the inner head located at an outer diameter of a disk when the first pressure is estimated and the non-repeatable run-out data corresponding to the inner head.

5. The controller of claim 1, wherein the circuit estimates a first pressure in providing the compensation for a fly height of a head.

6. A disk drive, comprising a controller, as recited in claim 1, wherein the first pressure is within the disk drive.

7. The disk drive of claim 6, wherein $P_0$ is a second pressure corresponding to the non-repeatable run-out data $NRR_0$ and the temperature data $T_0$ of a second condition of the disk drive, a proportionality constant C and slope corresponding to the disk drive, the first pressure $P_1$ is determined by the equation:

$$P_1 = P_0 + \frac{NRR_1 - NRR_0 - C \times (T_0 - T_1)}{slope}.$$

8. The disk drive of claim 6, wherein, $P_0$ is a second pressure corresponding to the non-repeatable run-out data $NRR_0$ corresponding to the temperature data $T_0$ of a second condition of the disk drive, the first pressure $P_1$ is determined by the equation:

$$P_1 = P_0 \frac{T_1}{T_0} \frac{NRR_1}{NRR_0}.$$

9. The controller of claim 1, wherein the circuit uses an ideal gas law to determine the first pressure.

10. The controller of claim 1, wherein the circuit estimates the first pressure having the non-repeatable run-out data corresponding to only a lateral arm mode.

11. The controller of claim 1, wherein the circuit estimates the first pressure having the non-repeatable run-out data corresponding to only a suspension mode.

12. The controller of claim 1, wherein the circuit estimates the first pressure having the non-repeatable run-out data corresponding to only frequencies above 10 kHz.

13. The controller of claim 1, wherein the circuit estimates the first pressure having the non-repeatable run-out data corresponding to seeks of more than 5 tracks.

14. The controller of claim 1, wherein the circuit estimates the first pressure and calculates an altitude based on the first pressure.

15. A disk drive, comprising:
   a disk having a surface provided with a plurality of tracks for storing data;
   a head for reading data from the disk;
   an actuator for positioning the head relative to the disk; and
   a controller comprising a circuit that uses non-repeatable run-out and temperature data to provide a compensation for a fly height of the head.

16. The disk drive of claim 15, wherein the head is an outer head located at an inner diameter of a disk when the first pressure is estimated, the non-repeatable run-out data corresponding to the outer head.

17. A method, comprising:
   estimating a first pressure $P_1$ by the use of non-repeatable run-out data $NRR_1$ and temperature data $T_1$ corresponding to a disk drive;
   the method further comprising, before the act of estimating,
   determining $P_0$, a second pressure corresponding to non-repeatable run-out data $NRR_0$ and temperature data $T_0$ of a calibration condition of the disk drive;
   wherein the first pressure $P_1$ is determined by the equation:

$$P_1 = P_0 \frac{T_1}{T_0} \frac{NRR_1}{NRR_0}.$$

18. A disk drive, comprising:

a head for reading data from a disk;

a thermistor; and a controller for controlling a fly height of the head based on temperature data obtained from the thermistor to refine a pressure determination;

wherein the controller obtains the pressure determination based on non-repeatable run out data.

19. A method, comprising:

providing a compensation signal based on non-repeatable run-out data and temperature data; and adjusting a fly height of a head in accordance with the compensation signal.

* * * * *